June 6, 1944. I. J. SNADER ET AL 2,350,372
FEED MECHANISM FOR MACHINE TOOLS
Filed May 29, 1940 5 Sheets-Sheet 1
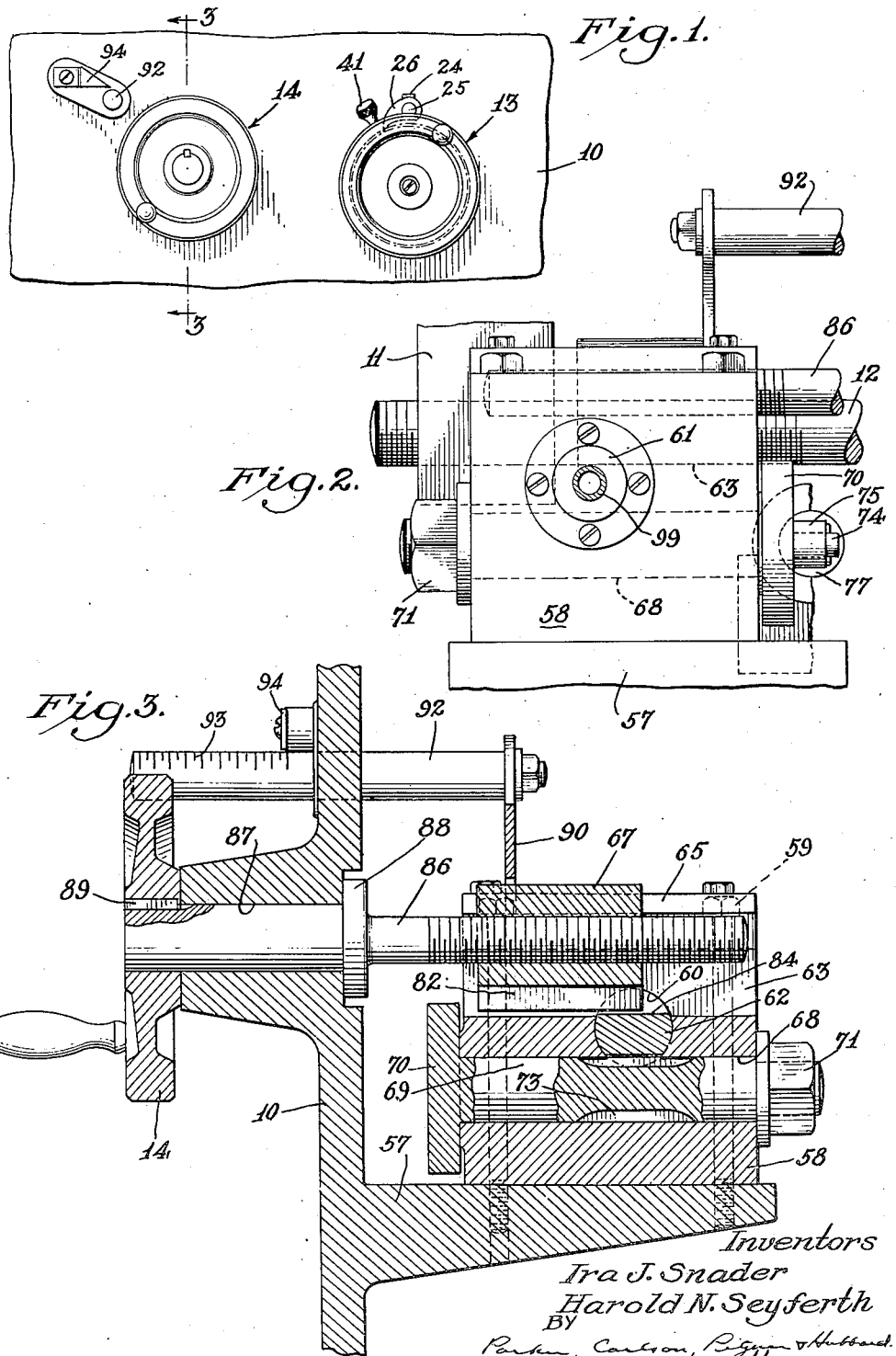
Inventors
Ira J. Snader
Harold N. Seyferth
BY
Parker, Carlson, Pigers & Hubbard.
Attorneys.

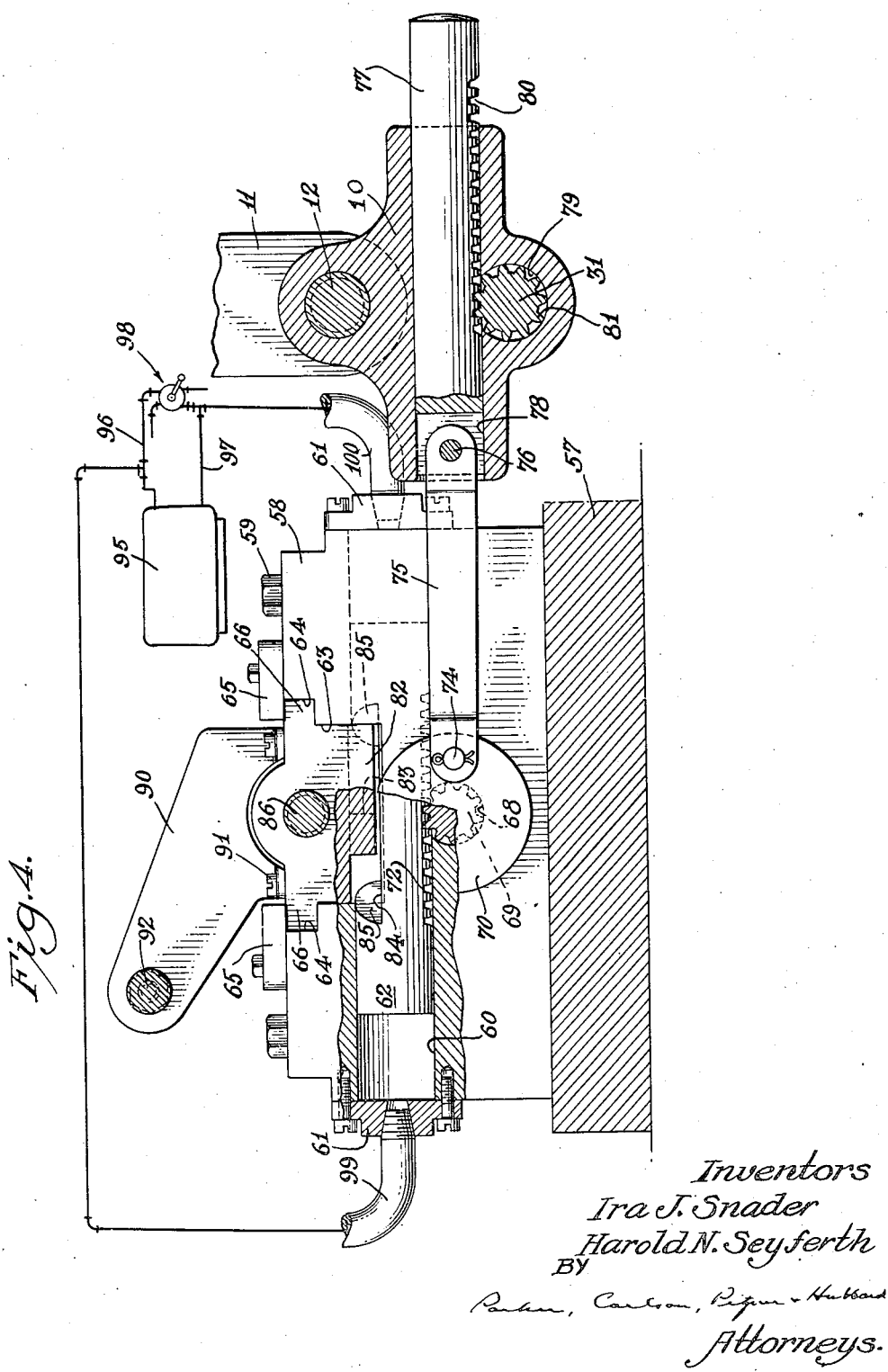

June 6, 1944. I. J. SNADER ET AL 2,350,372
FEED MECHANISM FOR MACHINE TOOLS
Filed May 29, 1940 5 Sheets-Sheet 3

Inventors
Ira J. Snader
Harold N. Seyferth
By
Parker, Carlson, Pigman & Hubbard
Attorneys.

June 6, 1944.    I. J. SNADER ET AL    2,350,372
FEED MECHANISM FOR MACHINE TOOLS
Filed May 29, 1940    5 Sheets-Sheet 5

Inventors
Ira J. Snader
Harold N. Seyferth
BY
Parker, Carlson, Pigue & Hubbard
Attorneys.

Patented June 6, 1944

2,350,372

UNITED STATES PATENT OFFICE 2,350,372

FEED MECHANISM FOR MACHINE TOOLS

Ira J. Snader, Detroit, and Harold N. Seyferth, East Detroit, Mich., assignors to Ex-Cell-O Corporation, Detroit, Mich., a corporation of Michigan Application May 29, 1940, Serial No. 337,826

11 Claims. (Cl. 74—120)

The invention relates to feed mechanism for machine tools and particularly to a tool feeding mechanism especially applicable to that class of machine tools such as lathes, milling machines, and surface and cylindrical grinding machines in which an incremental feed movement is automatically effected at the end of a relative longitudinal traverse between the workpiece and cutting tool. As an example of a machine tool in which the instant feed mechanism may be incorporated, reference may be had to the thread grinding machine tool disclosed in the copending application of Ira J. Snader Serial No. 177,693, filed December 2, 1937 (Patent No. 2,251,961).

A general object of the invention is to provide a novel feed mechanism which is of comparatively simple, rugged construction, which is efficient in operation and permits of accurate reproduction of workpieces to predetermined dimensions.

Another object is the provision of improved mechanism of this character which embodies, as a part of this feed means, a pawl and ratchet device for effecting a feed movement, and means for substantially increasing the range of such feed movement over the depth of feed resulting from a single revolution of the ratchet.

In conjunction with the foregoing, another object is to provide an improved feed mechanism having means for variably adjusting and automatically controlling the depth of feed over a range unlimited by one revolution of a feeding ratchet.

Another object is to provide an improved feed mechanism in which the depth of feed and the rate of feed may be adjustably controlled by means which readily permits any adjustment to be accurately reproduced.

Another object is to provide novel means for accurately and adjustably controlling the increment or rate of feed.

Another object is to provide a feed mechanism for a machine tool of the type in which a cutting operation is performed during each relative traverse of the workpiece and cutting tool which mechanism embodies means for accurately obtaining a precise increment of feed at each reversal of such relative traverse.

Other objects and advantages will become apparent in the following description and from the accompanying drawings, in which:

Figure 1 is an elevational view on a reduced scale of the front portion of a machine apron or base on which a feed mechanism embodying the present invention is mounted.

Fig. 2 is a left-hand elevational view of the mechanism as shown in Fig. 4.

Fig. 3 is a vertical transverse sectional view through the rate of feed controlling means and is taken along the line 3—3 of Fig. 1.

Fig. 4 is an elevational view of the the feed mechanism behind the apron or base of Fig. 1 and is taken generally along the line 4—4 of Fig. 5, but with certain parts of the mechanism in vertical longitudinal cross section.

Figure 5:
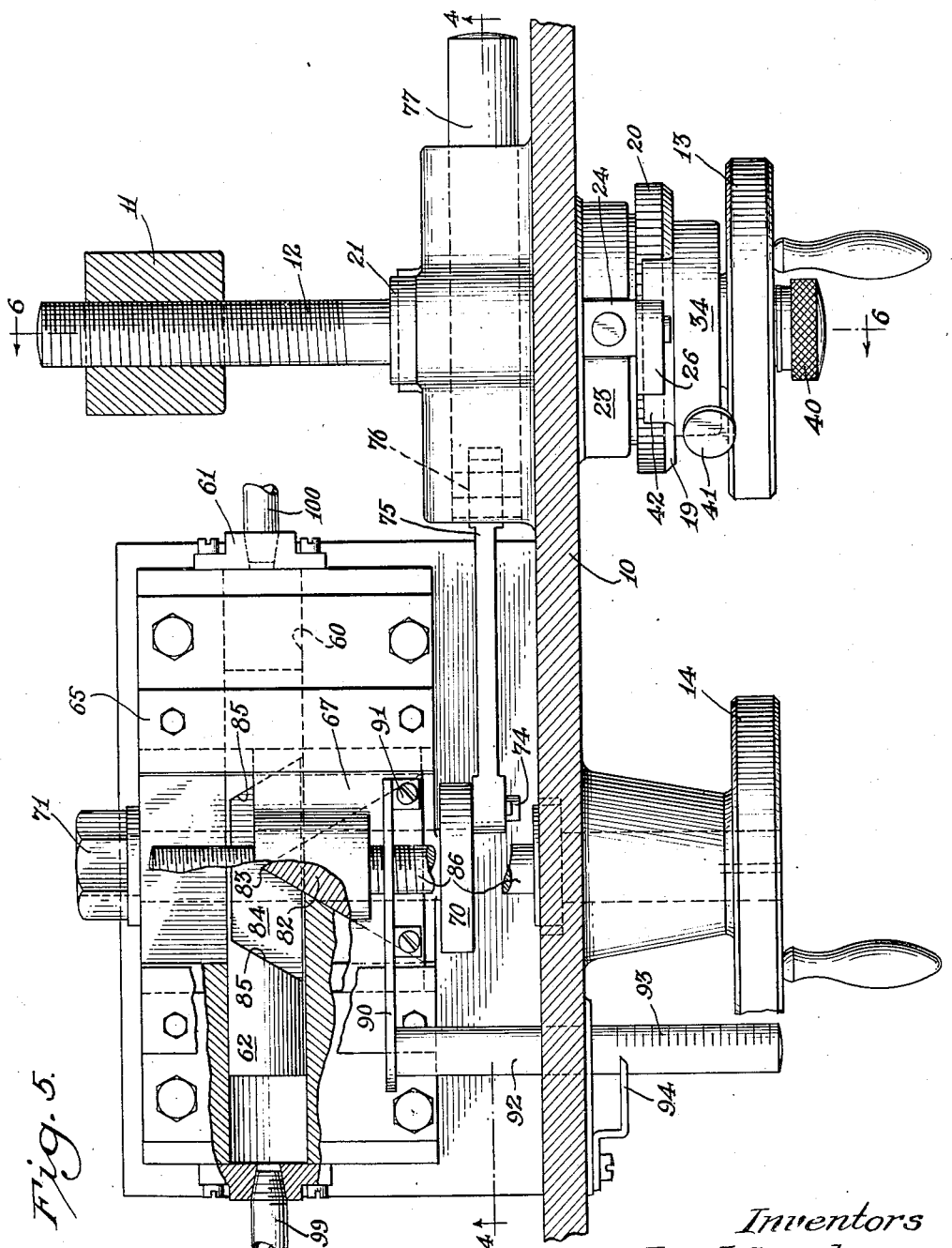
Fig. 5 is a plan view of the feed mechanism, certain portions thereof being in horizontal section to illustrate internal construction.
Figure 6:
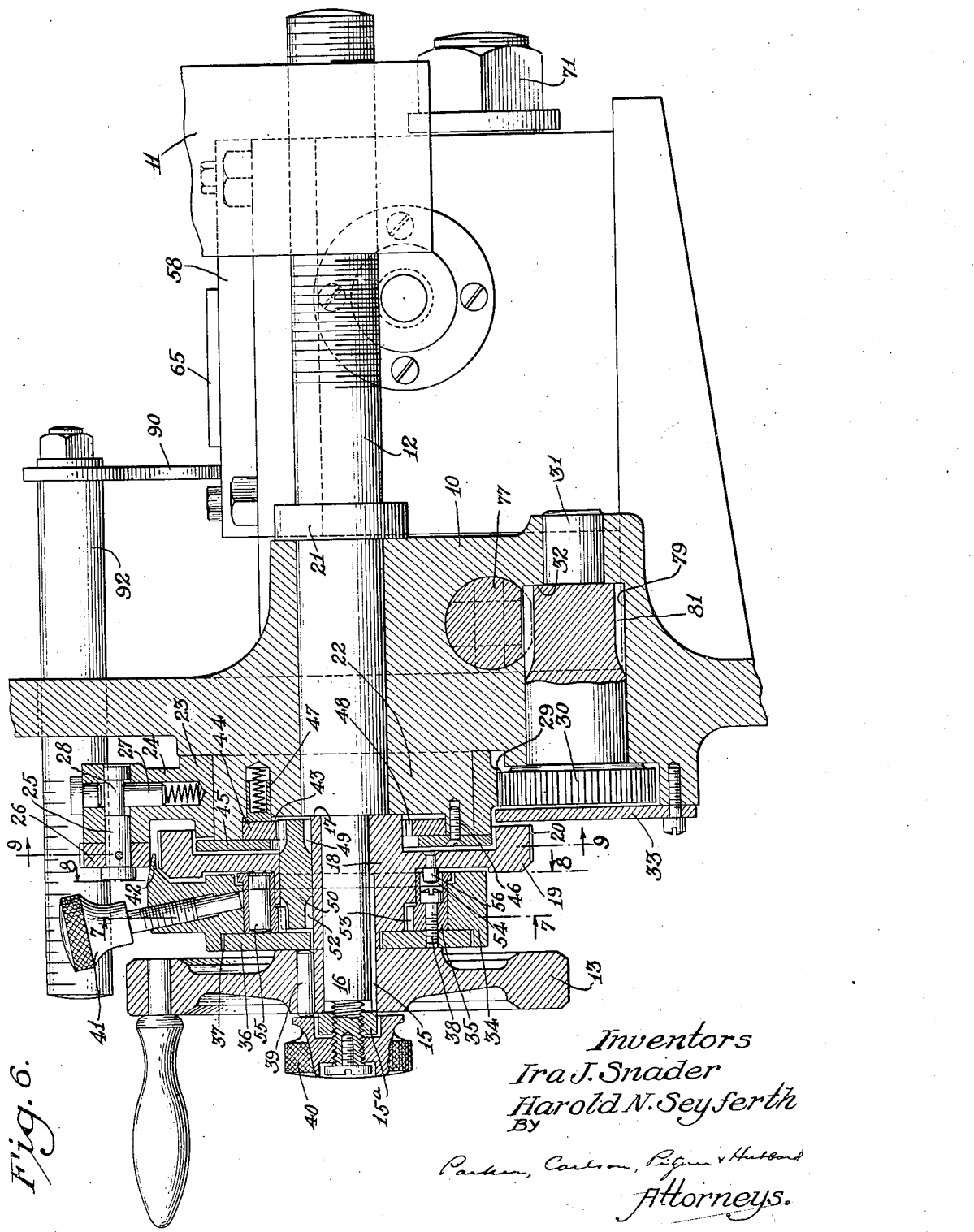
Fig. 6 is a vertical transverse sectional view on an enlarged scale through the depth of feed means, and the view is taken along the line 6—6 of Fig. 5.
Figure 7:
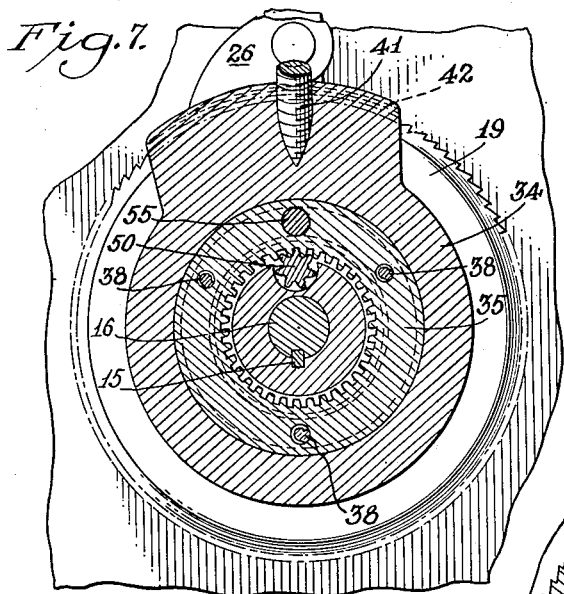
Figure 9:
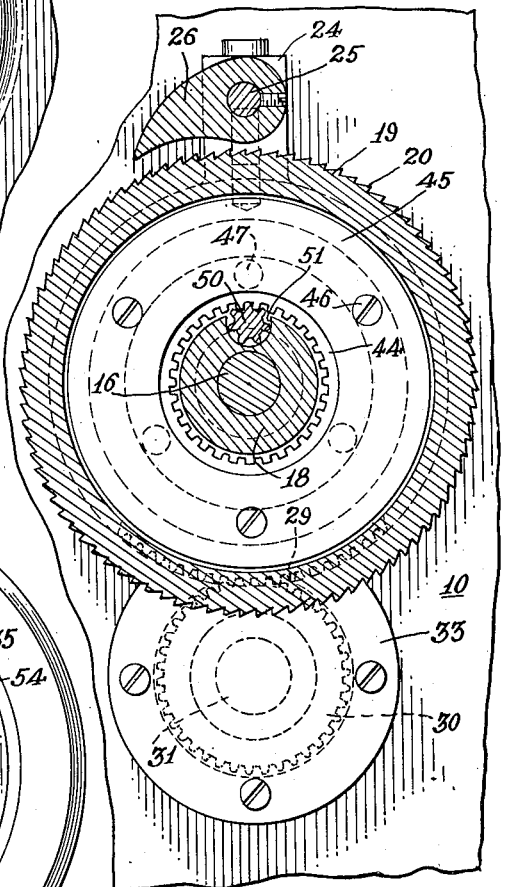
Figure 8:
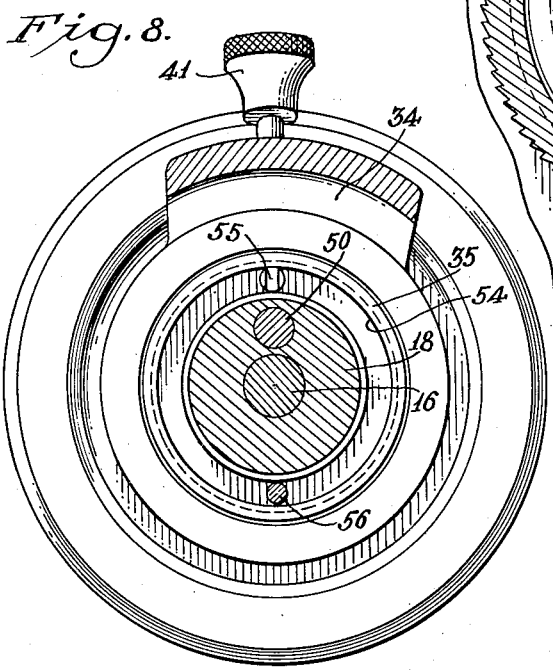

Figs. 7, 8 and 9 are vertical sectional views through the depth of the feed means taken respectively along the lines 7—7, 8—8 and 9—9 of Fig. 6.

While the invention is susceptible of various modifications and alternative constructions, we have shown in the drawings and will herein describe in detail the preferred embodiment, but it is to be understood that we do not thereby intend to limit the invention to the specific form disclosed, but intend to cover all modifications and alternative constructions falling within the spirit and scope of the invention as expressed in the appended claims.

Referring to the exemplary embodiment of the invention as shown in the drawings, the numeral 10 designates a portion of the apron or machine base of a machine tool (not shown), but which includes a nut 11 rigid with the feed slide or carriage for engagement by a feed screw on the end of a feed screw shaft 12. Adjacent to the outer face of the apron are hand wheels 13, 14 which, through means hereinafter to be described, respectively control the depth of feed and the rate or increment of feed. While the means by which the feed rate and depth of feed are controlled have a correlated and interconnected relation, it will be convenient to consider each separately.

Referring particularly to Figs. 6 to 9, inclusive, it will be noted that the depth-of-feed wheel 13 is secured, as by a key 15 and end nut 15ª, to a reduced end 16 of the feed screw shaft 12. Interposed between the wheel 13 and a shoulder 17 on the feed shaft and keyed to the feed screw shaft by the key 15 is an elongated hub 18 of a ratchet wheel 19 provided with peripheral ratchet teeth 20. The feed screw is journaled in an enlargement on the apron 10 and is held against axial movement by the opposing abutments therewith of the hub 18 and a collar 21 on the feed screw shaft. A circular boss 22 on the outer face of the apron supports a collar 23 for rocking or oscillating movement. The collar carries a radial projection 24 having near its outer end a transversely extending pin 25 to which a pawl 26 is secured in position for operative engagement with the ratchet teeth 20. Such means as a spring pressed detent 27 engaging an eccentric portion 28 on the pin 25 yieldingly urges the pawl against the ratchet teeth and permits the pawl to be swung to an inoperative disengaged position.

The collar 23 has gear teeth 29 (Figs. 6 and 9) formed as a peripheral segment thereon for engagement by a gear 30 supported by a stub shaft 31 which is journaled on the apron and is held against axial movement by interengaging shoulders 32 on the shaft and the apron and by a closure plate 33 secured to the apron to overlie the outer end face of the gear. Means to be presently described imparts an oscillatory movement to the shaft 31 for rocking the pawl through its drive and recovery strokes.

Means is provided for automatically discontinuing the ratchet drive when the feed has continued to a predetermined depth. Such means heretofore has been so limited that the maximum predetermined depth of feed could not be greater than that resulting from slightly less than one revolution of the ratchet. A feature of the present invention is the provision of means whereby the maximum predetermined depth of feed is not limited to that produced by a single ratchet revolution. A preferred structural arrangement for achieving this end is as follows: The outer end of the ratchet wheel hub 18 supports a collar 34 through an interposed ring 35 which is relatively rotatable to the hub and to the collar. A disk 36 is seated in a recess 37 in the outer faces of the collar 34 and hub 18 and is secured to the intermediate ring 35 by screws 38.

The wheel 13 has a series of pins 39 slidably mounted in its hub portion for movement in an axial direction into engagement with the plate 36. A locking knob 40 screw threadedly engaging the extreme end portion of the shaft portion 16 may be turned to bear against the pins 39 to force them into abutting, binding engagement with the plate 36. When the locking knob is set against the pins 39, the ring 35 and ratchet wheel have unitary movement. The collar is adjustably secured to the ring by such means as a generally radially extending locking screw 41 on the collar engageable with the ring. The rotative position of the collar with respect to the ratchet may, therefore, be adjustably fixed. The collar is peripherally enlarged through one segment and a finger 42 projects axially therefrom into overlying relation to the ratchet teeth 20. The finger constitutes what is known as a knock-off shield for engaging and holding the pawl 26 out of engagement with the ratchet teeth whereby to stop the feed at a predetermined point.

The means which has been described will determine any depth of cut which is limited to that resulting from less than a single revolution of the ratchet wheel and feed screw. Thus, the operator having first adjusted the machine elements to an initial position by rotation of the handwheel 13, sets the collar 34 to locate the knock-off shield 42 in such relation to the pawl 26 that the knock-off shield will prevent the pawl from engaging the ratchet after the feed screw, ratchet and knock-off shield have moved through the rotational distance required to feed the nut 11 a predetermined distance. Obviously the maximum depth of cut obtainable when the parts are in this relationship is limited to less than one complete revolution; more exactly to one complete revolution less the angle subtended by the arc or circumferential dimension of the knock-off shield 42.

To increase the range of the depth of feed means so that the maximum available depth or increment of feed capable of automatic control is more than double the available increment when the parts are in the relationship above described, means is provided by which a substantially complete revolution of the ratchet wheel may occur before the shield begins to travel toward engagement with the pawl. Thus, the face of the boss 22 opposing the hub 18 of the ratchet wheel 19 is recessed, as at 43, to receive an internal ring gear 44 which is held in the recess by a retaining ring 45 secured as by screws 46 to the apron. This ring holds the pawl collar 23 against axial movement and also provides a friction face toward which the ring 44 is urged by such means as a series of spring plunger units 47.

The ring gear 44 has internal gear teeth 48 for engagement with gear teeth 49 formed on one end of a cylindrical pinion 50 that is seated in a nest 51 (Fig. 9) in the hub 18 of the ratchet. Gear teeth 52, similar to the gear teeth 49, are formed on the opposite end of the pinion 50 for engagement with teeth 53 formed on the inner surface of the ring 35. As may be seen in Figs. 6 and 8, the end face of the ring 35 opposing the ratchet wheel has an annular groove 54 therein. A pin 55 is mounted in the ring 35 with the flattened end thereof projecting into the groove 54. A pin 56 is secured to the ratchet to extend into the groove for engagement with the head of pin 55. This arrangement provides in effect lost motion connecting means between the ring and the ratchet.

In operation, and presuming that an extended depth of cut is desired, the lock nut 40 is loosened to release the binding engagement between the pins 39 and the plate 36 thereby freeing the ring 35 for rotational movement relative to the ratchet wheel hub 18. Through the adjusting means previously described, the position of the shield with respect to the pawl is set at a predetermined point as determined by suitable cooperating indicia (not shown). In making this adjustment, the operator takes into consideration the fact that the increment at which the shield 42 is set is increased by a complete revolution of the feed screw. When the pawl is driven to advance the ratchet, the pinion 50 moves with the ratchet. During the first revolution, the ring gear 44 is held against movement by its frictional engagement with the retaining plate 45. Because of the planetary arrangement of the pinion 50 with respect to the ring gear 44 and the gear teeth 53 on the ring 35, the ring and the shield 42 initially remain stationary. However, when the pin 56 on the ratchet wheel travels into engagement with the pin 55 on the ring 35, the parts are connected for movement as a unit, during which movement the ring gear 44 slips relative to the retainer plate 45, which movement continues until the shield engages the pawl to lift it out of operative engagement with the ratchet wheel.

Approximately, the same sequence is followed when the mechanism is reset. The pawl is first swung upwardly to a position in which it cannot engage the ratchet wheel, after which the operator turns the machine wheel 13 to retract the feed screw. During the first revolution of the feed screw, the shield remains stationary as the pin 56 on the ratchet wheel traverses the groove 54 to engage the other side of the pin 55. Continued rotation moves the shield to its starting position.

The means associated with the hand wheel 14 determines the rate of feed by controlling the extent of movement of the pawl and the present control means is well adapted for use in machine tools in which a cutting operation is performed during each traversing movement of the work table as well as in machine tools in which the cutting operation occurs only during a traversing movement of the work table in one direction. Referring to Figs. 2 to 5, inclusive, the apron has a shelf 57 extending horizontally from its inner face to receive and support a housing 58 which is secured thereto as by screws 59. Extending through a central portion of the housing in a direction parallel to the apron is a bore 60 having its opposite ends closed by plates 61. The end portions of the bore form cylinders for the opposite ends of a reciprocable piston 62.

In the upper face of the housing is a recess 63 of substantial size extending transversely of the housing in a direction perpendicular to the apron and to the bore 60. Grooves 64 (Fig. 4) in the upper margins of the recess 63 and cooperating gib strips 65 secured to the housing provide ways for slidably receiving guides 66 on a block 67. The lower portion of the recess 63 intersects the upper portion of the bore 60. Beneath the bore 60 is a transverse bore 68 paralleling the recess 63 and intersecting the lower portion of the bore 60 (see Fig. 3). A shaft 69 is rotatably mounted in the bore 68 and is held against axial movement by a crank disk 70 at one end and a nut and washer assembly 71 at the other end. An intermediate portion of the lower side of the piston 62 has a rack 72 (Fig. 4) formed therein for engagement with gear teeth 73 (Fig. 3) on an intermediate portion of the shaft 69. Reciprocation of the piston will, therefore, oscillate the shaft 69 and the crank disk 70.

Pinned to the crank disk, as at 74, is a link 75 (Fig. 4) that extends toward the depth of feed means. The link is pivotally connected, as at 76, through its free end with a reciprocable plunger 77. The plunger is slidably mounted in a bore 78 (Fig. 6) in which which intersects the bore 79 (Fig. 6) in which the stub shaft 31 is mounted. The plunger has a rack 80 on its lower surface for engagement with gear teeth 81 on the stub shaft 31. As shown best in Fig. 4, the pivotal connection 74 between the link 75 and crank disk 70 is such that the plunger 77 is at one extreme limit of its travel when the piston 62 is at the mid-point of its movement in either direction in the bore 60. Hence, either movement of the piston 62 will drive the plunger 77 through a reciprocatory movement which is toward and away from a fixed limit of travel. Moreover, the opposite movements of plunger 77 with respect to the fixed point of reversal of its movement will always be exactly equal in length.

The foregoing relationship is important because it permits of an efficient control of the rate of feed by means which may be adjusted to vary the length of the reciprocatory stroke of the plunger 77. This means adjustably controls the rate of feed by varying equally the permissible movement of the piston 62 in either direction from the mid-point of its movement. Thus, the block 67 has on its lower face an abutment 82 preferably in the form of an isosceles triangle having its apex 83 entering a slot 84 formed midway of the upper portion of the piston 62. The apex of the abutment is disposed on the mid-point of the travel of the piston and the shoulders 85 provided by the end walls of the slot 84 are fashioned on angles which complement the angles of the opposing faces of the abutment. As may best be seen in Fig. 3, a shaft 86 is journaled in a bore 87 in the apron and is held against axial movement by a collar 88 and the machine wheel 14 which is keyed, as at 89, to the outer end of the shaft.

The inner end of the shaft 86 is screw threaded for engagement with the block 67 whereby the operator's manipulation of the wheel 14 will adjust the position of the triangular abutment 82 with reference to the piston slot 84. The end limits of the travel of the piston are, therefore, adjustable with respect to the mid-point of travel and the piston will travel equal distances beyond either side of the mid-point designated by the apex of the triangular abutment. The length of the stroke may be adjusted by infinitesimal increments between a condition of full stroke, in which the triangular abutment is withdrawn to such position that it will not be engaged by the shoulders 85 on the piston, and a condition of no stroke in which the abutment is fully inserted into the slot and through engagement with both shoulders prevents movement of the piston. It should be noted that such adjustment of the piston stroke does not alter the mid-position of the crank disk 70 or the fixed point of the reversal of movement of the reciprocatory plunger 77 during its pawl actuating cycle. Hence, the driving movement of each piston stroke will produce identical feed movements of the feed screw and the feed element driven thereby.

Means may be provided for indicating to the operator the setting of the abutment with respect to the piston slot so that a stroke of any length and, consequently, any increment of feed may be instantly reproduced. To this end the block 67 has an upstanding bracket 90 secured thereto as by screws 91. The bracket carries an elongated rod 92 fixed to extend parallel to the axis of shaft 86 and through the wall of the apron 10. The outer end of the rod carries a series of graduations 93, and a pointer 94 indicates the setting of the triangular abutment.

The present tool feeding mechanism is especially applicable to that class of machine tools in which a cutting operation is performed on each traverse of the work table. Included in Fig. 4 is a diagrammatic illustration of one way in which the present mechanism may be incorporated in a machine tool having a hydraulic motor for traversing the work table. The numeral 95 designates generally such a motor having pressure and return lines 96 and 97, respectively, connected thereto. The motor is suitably connected to drive a work table (not shown) through its traversing movements and reversal of table movement is effected by reversing the motor as by means of a suitable valve 98.

The end plates 61, closing the bore 60, are each tapped to connect with a fluid conduit 99 and 100 and these conduits lead to the lines 96, 97, respectively, to connect the main driving motor 95 and the motor represented by the piston 62 and bore 60 in multiple. Hence, whenever the motor 95 is reversed, fluid connections to the opposite ends of the piston 62 are simultaneously reversed to actuate the ratchet and pawl mechanism and feed the work to the extent determined by the setting of the triangular abutment in the piston slot. Since the inertia of the work table and the other elements driven by the main driving motor 95 is much greater than that of the feeding mechanism, the piston 62 will complete its stroke upon a reversal of the main driving motor almost instantly and sufficiently in advance of the reversed movement of the feed table to insure that the feeding movement of the workpiece will have been completed prior to travel of the work table in the reversed direction. A predetermined increment of feed will be imparted to the feed carriage until lthe desired depth of feed, as determined by the setting of the depth-of-feed means, has been reached, at which time the knock-off shield will disengage the pawl from the ratchet.

The present feed mechanism may, if desired, be incorporated in machine tools in which the cutting operation is performed only during the movement of the work table in one direction. In such a case, the rate of feed adjustment is so set that each stroke of the piston 62 moves the feed carriage through a distance of one-half of the total depth of feed desired. Thus, when the main driving motor is reversed after a cutting traverse of the work table has been completed, the work will be fed a distance of one-half of its total increment at the beginning of the return movement of the work table and will be fed the other half of such increment when the direction of travel of the work table is again reversed at the beginning of a cutting traverse.

The fluid pressure actuated motor comprising the cylinder 60 and piston 62 is covered per se in our copending application Serial No. 490,150, filed June 9, 1943.

We claim as our invention:

1. In a feed mechanism, the combination of a feed screw shaft, a ratchet on said shaft, a driven pawl cooperating with said ratchet, a knock-off shield including a supporting collar, a ring interposed between said collar and shaft and relatively rotatable to both, means for adjustably connecting said collar to said ring, means for releasably securing said ratchet and ring together, means operable when the securing means is released frictionally to hold said ring against movement with said ratchet, and lost motion connecting means between said ratchet and ring engageable to drive said ring against the force of the frictional holding means.

2. In a feed mechanism, the combination of a feed element, a pawl and ratchet device drivingly connected with said element, an adjustable knock-off shield, and means drivingly connecting said knock-off shield to said ratchet including releasable means for securing said knock-off shield and ratchet together for unitary movement, and means effective when the releasable means is inoperative to establish the drive following a predetermined relative movement between said knock-off shield and ratchet.

3. In a feed mechanism, in combination, a feed screw, a pawl and ratchet device for driving said feed screw, and means for automatically discontinuing the drive by the pawl and ratchet device after a predetermined feeding movement of said feed screw including an adjustable member, means supporting said member for movement relative to said ratchet and for movement by said ratchet, and means for connecting said member with said ratchet after driven movement of said ratchet through a predetermined distance relative to said member.

4. In a feed mechanism, the combination of a feed element, a pawl and ratchet device drivingly connected with said element, an adjustable shield movable to discontinue the operative relation between said pawl and ratchet, and means for optionally connecting said shield with said ratchet for initial movement therewith or for movement therewith after a predetermined travel of said ratchet.

5. In a feed mechanism, in combination, a hydralic cylinder having a piston slidable therein, said cylinder having means for establishing the connection of its ends in multiple with the pressure fluid lines of a reversible hydraulic pump in a machine tool whereby to move said piston in opposite directions upon pump reversals, means for varying the extent of movement of said piston including spaced shoulders on said piston and an angular abutment adjustably positioned between said shoulders, a crank, driving means connecting said crank with said piston for movement in opposite directions in accordance with piston movements, a member reciprocably driven by movement of said crank in either direction, a feed element, and means for translating the reciprocatory movement of said member into an incremental movement of said feed element.

6. In a feed mechanism, in combination, a hydraulic cylinder having a piston slidable therein, said cylinder having means for establishing the connection of its ends with reversible pressure fluid lines, means for varying the extent of movement of said piston with respect to a fixed mid-point of movement, a crank, driving means connecting said crank with said piston for movement in opposite directions in accordance with piston movements, a member reciprocably driven by movement of said crank in either direction, a feed element, and means for translating the reciprocatory movement of said member into an incremental movement of said feed element.

7. In a feed mechanism, in combination, a feed element and means for imparting incremental feed movements to said element including a member movable in opposite directions, means for so moving said member, connecting means between said member and said feed element for driving said feed element incrementally upon movement of said member in either direction, and means for varying the extent of movement of said member with respect to a midpoint of movement constant for all variations thereof to change the feed increment.

8. In a feed mechanism, in combination, a feed element and means for imparting incremental feed movements to said element including pressure fluid actuated piston movable in opposite directions, connecting means between said piston and said feed element for driving said feed element incrementally upon movement of said piston in either direction, control means for varying the extent of movement of said piston with respect to a fixed mid-point of its movement to vary the feed increment, and means for indicating to an operator the setting of said control means.

9. In a feed mecahnism, the combination with a feed element, of a ratchet wheel drivingly connected with said element, an oscillatory pawl operatively associated with said ratchet wheel, and means for oscillating said pawl including a reciprocatory member connected to drive said pawl through a feed and recovery cycle, and driving means movable in opposite directions and connected with said member to move said member through a complete reciprocation upon movement of said driving means in either direction.

10. In a feed mechanism, the combination with a feed element, of a ratchet wheel drivingly connected with said element, an oscillatory pawl operatively associated with said ratchet wheel, a reciprocatory member for driving said pawl, driving means movable in opposite directions, and a rotary crank disk geared to said driving means and connected with said member for reciprocating said member upon movement of said driving means in either direction.

11. In a feed mechanism, the combination with a feed element, of a ratchet wheel drivingly connected with said element, an oscillatory pawl operatively associated with said ratchet wheel, means for driving said pawl through a feed and recovery movement including a first reciprocable member movable between two limits, one of which is fixed and the other of which is variable, a second reciprocable member movable between limits, means for adjusting the last mentioned limits uniformly with respect to a mid-point therebetween constant for all adjustments of said limits, and driving means connecting said first and second reciprocable members for driving said first reciprocable member through a complete cycle upon movement of said second reciprocable member in either direction, said fixed limit being the point of reversal of movement in said cycle.

IRA J. SNADER.
HAROLD N. SEYFERTH.